(12) United States Patent
Nagarajan et al.

(10) Patent No.: US 10,466,899 B2
(45) Date of Patent: Nov. 5, 2019

(54) SELECTING CONTROLLERS BASED ON AFFINITY BETWEEN ACCESS DEVICES AND STORAGE SEGMENTS

(71) Applicant: HEWLETT PACKARD ENTERPRISE DEVELOPMENT LP, Houston, TX (US)

(72) Inventors: Padmanabhan S. Nagarajan, Tewksbury, MA (US); Dinesh Venkatesh, Andover, MA (US); Franklin George, Andover, MA (US); Manny Ye, Quincy, MA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 188 days.

(21) Appl. No.: 15/662,915

(22) Filed: Jul. 28, 2017

(65) Prior Publication Data

US 2019/0034084 A1 Jan. 31, 2019

(51) Int. Cl.
*G06F 3/06* (2006.01)
*G06F 16/182* (2019.01)

(52) U.S. Cl.
CPC .......... *G06F 3/0604* (2013.01); *G06F 3/067* (2013.01); *G06F 3/0613* (2013.01); *G06F 3/0631* (2013.01); *G06F 3/0643* (2013.01); *G06F 3/0644* (2013.01); *G06F 3/0683* (2013.01); *G06F 16/182* (2019.01)

(58) Field of Classification Search
CPC ...... G06F 3/0604; G06F 3/0644; G06F 3/067; G06F 3/0683; G06F 16/182
See application file for complete search history.

(56) References Cited

U.S. PATENT DOCUMENTS

| 6,173,306 B1 | 1/2001 | Raz et al. |
| 6,587,866 B1 | 7/2003 | Modi et al. |
| 6,912,588 B1 | 6/2005 | Jardin |
| 8,027,951 B2 | 9/2011 | Doatmas et al. |
| 8,176,495 B2 | 5/2012 | Sen et al. |
| 8,244,864 B1 | 8/2012 | Bahl et al. |
| 8,370,571 B2 | 2/2013 | Maziina |

(Continued)

FOREIGN PATENT DOCUMENTS

| EP | 2003541 | 12/2008 |
| WO | WO-2010011827 | 1/2010 |
| WO | WO-2016190893 | 12/2016 |

OTHER PUBLICATIONS

DellEMC Data Sheet, Dell EMC Isilon Smartconnect dated on or before Jul. 28, 2017 (3 pages).

(Continued)

*Primary Examiner* — Ryan Bertram
(74) *Attorney, Agent, or Firm* — Trop, Pruner & Hu, P.C.

(57) ABSTRACT

In some examples, a system determines, based on information relating to access of objects in storage segments by requester devices, an affinity between access devices and the storage segments that are managed by respective controllers of a plurality of controllers, the access devices comprising the requester devices or the controllers. The system selects, based on the affinity between the access devices and the storage segments, a controller of the plurality of controllers for serving requests of a first requester device of the requester devices to access objects.

20 Claims, 6 Drawing Sheets

(56) References Cited

U.S. PATENT DOCUMENTS

| | | | |
|---|---|---|---|
| 8,386,741 | B2 | 2/2013 | Gupta et al. |
| 8,639,808 | B1 | 1/2014 | Vemuri et al. |
| 8,886,781 | B2 | 11/2014 | Jain |
| 9,213,485 | B1 | 12/2015 | Hayes et al. |
| 9,256,467 | B1 | 2/2016 | Singh et al. |
| 2005/0267929 | A1 | 12/2005 | Kitamura |
| 2009/0089458 | A1 | 4/2009 | Sugimoto et al. |
| 2009/0271535 | A1 | 10/2009 | Yamaguchi et al. |
| 2009/0328054 | A1* | 12/2009 | Paramasivam ....... G06F 9/5033 718/105 |
| 2010/0057923 | A1 | 3/2010 | Petter et al. |
| 2010/0262772 | A1* | 10/2010 | Mazina ................ G06F 3/0613 711/114 |
| 2013/0067125 | A1 | 3/2013 | Rizzo et al. |
| 2013/0067163 | A1* | 3/2013 | Velayudhan ............ G06F 13/12 711/114 |
| 2013/0266007 | A1* | 10/2013 | Kumbhare .............. H04L 45/56 370/389 |
| 2015/0263980 | A1* | 9/2015 | Kasturi ............... H04L 41/5009 709/226 |
| 2018/0341598 | A1* | 11/2018 | Patel .................. G06F 12/1045 |

OTHER PUBLICATIONS

IBM, "San Boot Implementation and Best Practices Guide for IBM System Storage," (Research Paper), Sep. 2012, 478 pages, available at https://www.redbooks.ibm.com/redbooks/pdfs/sg247958.pdf.

Adams, M., Hitachi Dynamic Virtual Controller Technology, (Research Paper), Mar. 2014, 10 pps. http:/www.hds.com/assets/pdf/hitachi-white-paper-dynamic-virtual-controller-technology.pdf.

Racherla, S. et al., IBM System Storage Ds3500 Introduction and Implementation Guide, (Research Paper), May, 2011, 768 pps. http://www.redbooks.ibm.com/redbooks/pdfs/sg247914.pdf.

SANtricity ES Storage Manager Concepts Guide for Version 10.77, (Research Paper), May 2011, 64 pps. https://docs.oracle.com/cd/E23944_01/pdf/E23968-01.pdf.

* cited by examiner

SELECTING CONTROLLERS BASED ON AFFINITY BETWEEN ACCESS DEVICES AND STORAGE SEGMENTS

BACKGROUND

A storage system can include data stored in storage devices. In some examples, storage controllers can manage access of the data in the storage devices. By distributing data across multiple storage devices and providing multiple storage controllers, data access throughput can be enhanced since data can be accessed from the multiple storage devices in parallel through respective storage controllers.

BRIEF DESCRIPTION OF THE DRAWINGS

Some implementations of the present disclosure are described with respect to the following figures.

Figure 1:
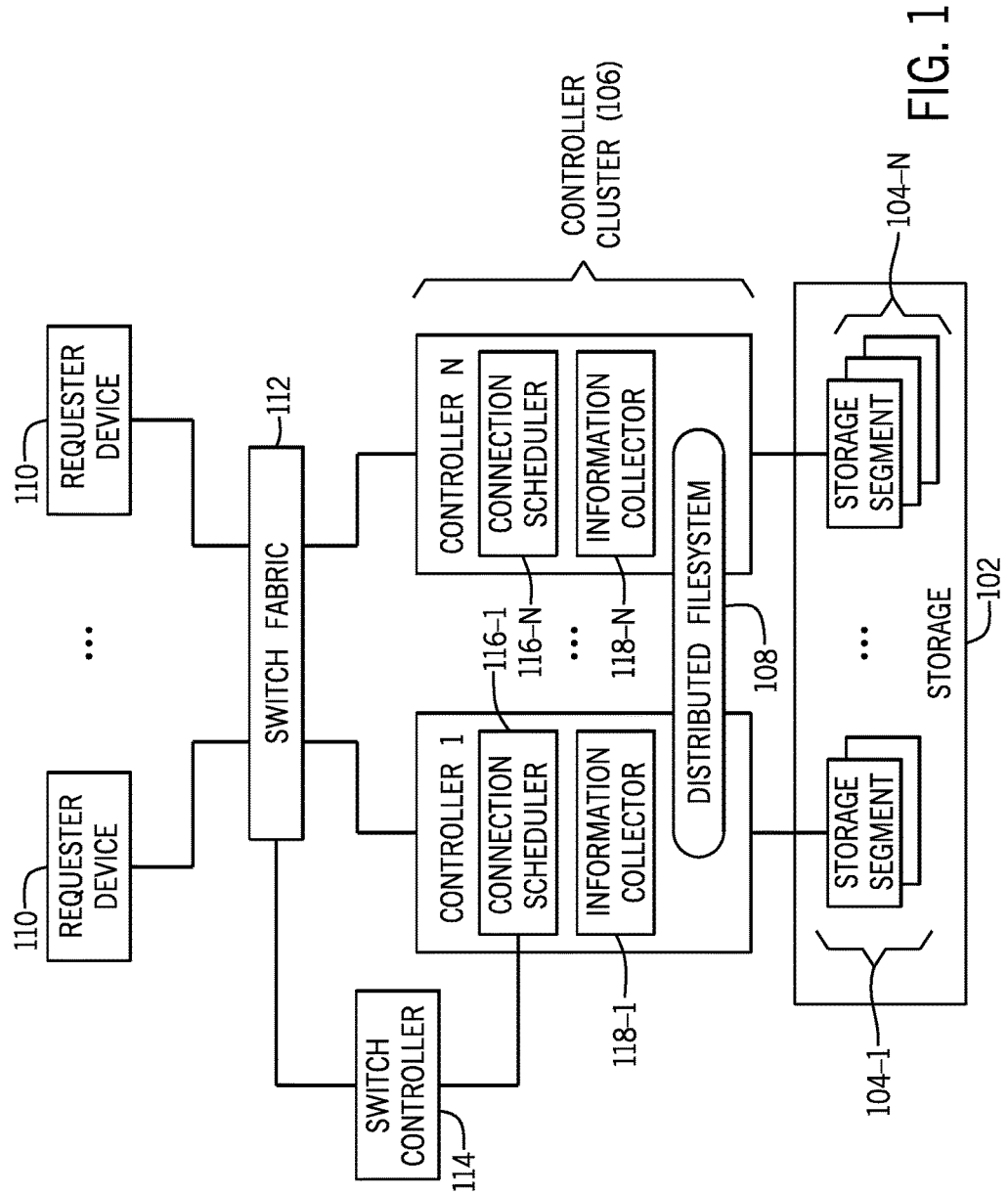
FIG. 1 is a block diagram of an arrangement that includes requester devices, controllers, and a storage with multiple storage segments, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A distributed storage arrangement can partition a storage into multiple storage segments. A "storage" can refer to physical storage entities (e.g., storage devices such as disk drives or solid-state storage devices) and/or logical entities (e.g., logical storage volumes or other logical units of data provided by machine-readable instructions). A storage segment can refer to a container of data, where the container can be any specified logical structure that is used to store data objects, such as in the form of files and directories or objects of other formats.

Access of data objects (or more simply "objects") in a storage segment can be managed by a storage controller. A "data object" or "object" can refer to any unit of data, such as a file, a directory, or another unit of data, that can be retrieved by a storage controller from a storage segment in response to an access request from a requester device. A "storage controller" (or more simply a "controller") can refer to a computer (or a portion of a computer) that accesses objects in a storage segment in response to an access request from a requester device. More generally, a controller can refer to any hardware processing circuit or a combination of a hardware processing circuit and machine-readable instructions executable on the hardware processing circuit. A hardware processing circuit can refer to any or some combination of a microprocessor, a core of a multi-core microprocessor, a microcontroller, a programmable gate array, a programmable integrated circuit device, and so forth.

An access request can include a read request to read an object, a write request to write an object to the storage segment, a request to obtain an attribute (e.g., metadata) of an object, or any other type of request that causes access of an object.

In some examples, a controller that manages access of a storage segment can "own" the storage segment. A controller is an owner of a storage segment if any access request from a requester device for an object in the storage segment has to be processed by the controller (rather than another controller).

To access objects stored in storage segments, a requester device can establish a connection (also referred to as a "client connection") with a particular controller. A "connection" can refer to a session or any other defined exchange of information that allows devices to communicate with one another.

If the requester device submits an access request for an object stored in a storage segment owned by the particular controller, then the particular controller can directly access the requested object in the storage segment. However, if the requester device submits an access request, to the particular controller, for an object stored in another storage segment (referred to as a "remote storage segment") that is not owned by the particular controller, then the particular controller would have to issue a remote request (e.g., a remote procedure call) to another controller that owns the remote storage segment. In response to the remote request received from the particular controller, the other controller accesses the requested object and returns the object to the particular controller, which in turn sends the object back to the requester device. In the latter case, a delay is added in the access of the object from the remote storage segment, since multiple controllers are involved. If a large number of requester devices are issuing access requests to controllers for objects not owned by the controllers, then inter-controller communications can lead to increased network traffic. The increased network traffic places a load on a network, which can slow down system performance.

In accordance with some implementations of the present disclosure, a system can track access requests by requester devices for objects in storage segments. Based on the tracking, an affinity between access devices (the requester devices or the controllers) and the storage segments can be determined. An affinity between a requester device and a storage segment is referred to as a requester-segment affinity. An affinity between a controller and a storage segment is referred to as a controller-segment affinity.

A requester-segment affinity between a given requester device and a given storage segment refers to an association between the given requester device and the given storage segment indicating an increased likelihood that the given requester device will access an object of the storage segment instead of an object in another storage segment.

A controller-segment affinity between a given controller and a given storage segment refers to an association between the given controller and the given storage segment indicating an increased likelihood that the given controller will receive a request (from a requester device) for an object of the given storage segment.

Based on the affinity between the access devices and the storage segments, a controller can be selected from among the controllers for serving access requests of each respective requester device.

FIG. 1 shows an example arrangement that includes a storage 102 partitioned into multiple storage segments 104-1 to 104-N (where N≥1). Each storage segment 104 (one of 104-1 to 104-N) can store an object (or multiple objects).

Access of objects stored by the storage segments 104-1 to 104-N can be managed by a controller cluster 106, which includes controllers 1 to N. In the example of FIG. 1, the storage segments 104-1 are owned by controller 1, while the storage segments 104-N are owned by controller N. Although the example of FIG. 1 shows each controller owning multiple storage segments, it is noted that in other examples, a controller can own just one storage segment.

The controllers of the controller cluster 106 can implement a distributed filesystem 108, which exposes a view of a filesystem namespace to requester devices 110. Each controller of the controller cluster 106 presents a consistent (i.e., same) view of the filesystem namespace. A filesystem namespace includes information that assigns names to files and directories managed by the distributed filesystem 108. The files and directories of the distributed filesystem 108 are stored as objects in the storage segments 104-1 to 104-N. Although the storage segments 104-1 to 104-N are depicted as being separate from the distributed filesystem 108, it is noted that storage segments 104-1 to 104-N can also be considered to be part of the distributed filesystem 108.

Although reference is made to examples where a distributed filesystem is used, it is noted that in other examples, the controllers of the controller cluster 106 are able to manage access of objects of the storage segments 104-1 to 104-N without use of a filesystem.

The requester devices 110 are able to access the controllers of the controller cluster 106 through a switch fabric 112. The switch fabric 112 includes a switch, or alternatively, multiple switches. Each switch is to route requests and data between a requester device 110 and a corresponding controller of the controller cluster 106.

In the example of FIG. 1, the switch fabric 112 is controlled by a switch controller 114. In some examples, the switch controller 114 can be a software-defined networking (SDN) controller. The switch controller 114 is able to configure routing information in the switch fabric 112 to direct requests and data between each requester device 110 and a corresponding controller of the controller cluster 106. The routing information can include a flow table or routing table. The routing information includes entries that map a given requester device 110 to a corresponding controller, such that the given requester device 110 establishes a connection with the given controller.

In other examples, the switch controller 114 can be omitted. In such other examples, the requester devices 110 can be interconnected with the controllers of the controller cluster 106 over a network. Thus, generally, the switch fabric 112 can be considered part of a network that interconnects requester devices 110 and controllers of the controller cluster 106.

The controller cluster 106 exposes a common cluster network address, such as a cluster Internet Protocol (IP) address, to the requester devices 110. The requester devices 110 use the cluster IP address to establish connections with the controllers of the controller cluster 106.

In further examples, there can be multiple clusters of controllers, where each different cluster of controllers is associated with a respective different cluster IP address.

In accordance with some implementations of the present disclosure, each controller of the controller cluster 106 includes a connection scheduler 116 (one of 116-1 to 116-N in FIG. 1). The connection scheduler 116-1 is part of controller 1, and connection scheduler 116-N is part of controller N. The connection schedulers 116-1 to 116-N are able to track accesses of objects in the storage segments 104-1 to 104-N by the requester devices 110, and to use information derived from the tracking to determine affinity between access devices and the storage segments 104-1 to 104-N. As used here, the term "access device" can refer to either a requester device 110 or a controller of the controller cluster 106. As noted above, the determined affinity can include a requester-segment affinity and/or a controller-segment affinity.

Although FIG. 1 shows a connection scheduler in each of the controllers of the controller cluster 106, it is noted that in other examples, just one connection scheduler 116 can be included in one of the controllers. In examples where there are multiple connection schedulers, the connection schedulers 116-1 to 116-N are able to communicate with one another such that the multiple connection schedulers are able to determine affinities between different access devices and storage segments based on tracking of accesses of objects by the requester devices 110.

By tracking accesses of objects by a given requester device 110, a connection scheduler 116 (any one or some combination of the connection schedulers 116-1 to 116-N) is able to determine which storage segment 104 is more frequently accessed by the given requester device 110, and based on this information, the connection scheduler 116 is able to identify an affinity between the given requester device 110 and the given storage segment 104.

In other examples, an affinity can be determined between a given controller of the controller cluster 106 and a given storage segment 104. In such examples, a connection scheduler 116 can determine based on tracking of accesses of objects by the requester devices 110 that a given controller is receiving more requests for objects in a given storage segment (which it may or may not own) than other storage segments. In such an example, an affinity can be identified between the given controller and the given storage segment 104.

Affinity between an access device (requester device or controller) and a storage segment can be determined by computing affinity measures that represent respective relationships between the access device and various storage segments. The affinity measures are compared, and the largest (in some examples) affinity measure indicates that the access device has an affinity with the storage segment associated with the largest affinity measure. An affinity measure is computed by tracking a count of accesses of a storage segment by an access device, possibly weighted for different types of access operations.

In accordance with some implementations of the present disclosure, the connection schedulers 116-1 to 116-N can produce affinity information relating to affinity between the requester devices 110 and the storage segments 104-1 to 104-N, and/or between the controllers and the storage segments 104-1 to 104-N. In some examples, the connection schedulers 116-1 to 116-N can generate requester-segment affinity information (e.g., a map that correlates requester devices to respective storage segments) and controller-segment affinity information (e.g., a map that correlates controllers to respective storage segments). In other examples, the requester-segment affinity map and the controller-segment affinity map can be combined into one affinity map.

Note that the affinity information can indicate an affinity between one access device and one storage segment, or an affinity between one access device and multiple storage segments, or an affinity between multiple access devices and one storage segment, or an affinity between multiple access devices and multiple storage segments.

In some examples, the connection schedulers 116-1 to 116-N are implemented as programs (including machine-readable instructions) of the switch controller 114. In further examples, the connection schedulers 116-1 to 116-N can be separate from the switch controller 114, or alternatively, the connection schedulers 116-1 to 116-N can operate without the presence of the switch controller 114.

Based on the affinity determined between access devices and the storage segments 104-1 to 104-N, techniques or mechanisms according to some implementations of the present disclosure are able to select a controller of the controller cluster 106 for serving requests of each respective requester device 110 to access objects in the storage 102. Selecting the controller to serve requests of a given requester device 110 can refer to selecting the controller for the establishment of a connection between the given requester device 110 and the selected controller. In such examples, based on the affinity between given requester device 110 and a given storage segment, the controller that is selected is the owner of the given storage segment. The given requester device 110 can establish a connection with the selected controller, such that any requests from the given requester device 110 to access objects in the storage 102 would be routed through the selected controller. If the given requester device 110 previously established a connection with another controller, then the controller selection based on the determined affinity can cause the given requester device 110 to change its connection from the other controller to the selected controller (this refers to migration of the connection).

In other examples, the controller selection based on the determined affinity can result in changing an ownership of a given storage segment 104 from a first controller to the selected controller. In other words, the given storage segment 104 can be previously owned by a first controller. In response to selecting the controller based on the affinity between controllers and storage segments, ownership of the given storage segment can be changed from the first controller to the given controller.

In examples where connections between requester devices 110 and corresponding controllers of the controller cluster 106 are changed (or set) based on the determined affinity between requester devices 110 and storage segments 104-1 to 104-N, the affinity information can be provided by the connection schedulers 116-1 to 116-N to the switch controller 114, which in turn can program the routing information of the switch fabric 112 to cause connections to be established between each requester device 110 and a selected one of the controllers of the controller cluster 106 based on the affinity information. In this manner, the connection schedulers 116-1 to 116-N can collectively determine the distribution of connections between the requester devices 110 and the controllers of the controller cluster 106 based on the affinity information.

Similarly, in alternative examples, the connection schedulers 116-1 to 116-N can collectively determine the ownership of storage segments 104-1 to 104-N by respective controllers of the controller cluster 106.

As further shown in FIG. 1, each controller of the controller cluster 106 includes a respective information collector 118-1 to 118-N. The information collector can include an agent or multiple agents that are able to acquire specific information. For example, the information collector 118 (any of 118-1 to 118-N) can obtain segment ownership information for the respective controller. The segment ownership information can be provided by the information collector to the respective connection scheduler 116 to determine which storage segment(s) is owned by a respective controller.

The information collector 118 can also obtain client connection information, which indicates which requester device(s) 110 has established a connection with a respective controller.

The information collector 118 can also obtain resource utilization information that obtains information regarding utilization of various resources of a respective controller. The resources can include a processing resource (e.g., a microprocessor, a microcontroller, a computer, etc.), a storage resource (e.g., a memory, a persistent storage device, etc.), a network resource (e.g., a network interface controller or other communication interface to communicate over a network), and/or any other resource of the controller.

As discussed further below, the resource usage information obtained by the information collectors 118-1 to 118-N can be provided to the connection schedulers 116-1 to 116-N to use in selecting a controller with which a given requester device is to establish a connection, or in selecting a controller as the owner of a given storage segment.

Figure 2:
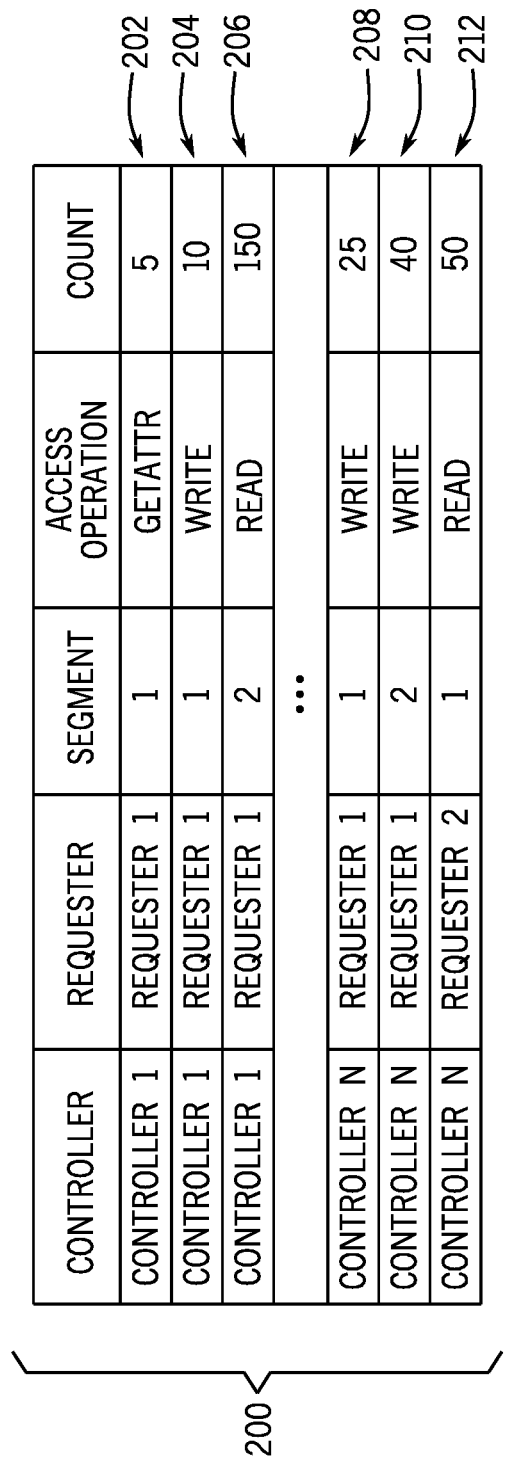
FIG. 2 illustrates an affinity map according to some examples.

FIG. 2 shows an example of an example affinity map 200 that is derived based on tracking accesses of storage segments by requester devices using connections with respective controllers. The affinity map 200 is a combined affinity map that correlates requester devices with storage segments and controllers with storage segments.

The affinity map 200 includes rows that correspond to respective combinations of controllers, requester devices, storage segments, and access operations. A given row of the affinity map 200 includes information relating to a given type of access operation of a given storage segment by a given requester device that has established a connection with a given controller.

A first column of the affinity map 200 identifies a controller (the controller with which a respective requester device has established a connection), a second column of the affinity map 200 identifies a requester device, a third column of the affinity map 200 identifies a storage segment, a fourth column of the affinity map 200 identifies a type of access operation, and a fifth column of the affinity map 200 indicates the count of the number of access operations of a respective type.

For example, a first row 202 of the affinity map 200 specifies that requester device 1 (identified by an identifier such as a specific IP address and port number) has established a connection with controller 1 (identified by a controller identifier such as an IP address and port number), and has accessed storage segment 1 with a GETATTR access operation, which is an access operation to obtain an attribute of an object. The count of "5" in the row 202 indicates that the requester device 1 has established a connection with controller 1 to issue 5 GETATTR access operations of object(s) in storage segment 1.

Other rows 204, 206, 208, 210, and 212 indicate respective numbers of access operations by requester devices that have established connections with corresponding controllers to access respective storage segments.

More generally, in the affinity map 200, for each pair of a respective requester device and a respective storage segment correlated by the affinity map 200, statistical information indicating an amount of accesses of objects in the respective storage segment by the respective requester device is included. In the example of FIG. 2, the statistical information includes a count of the number of access operations of a given type.

In the example of FIG. 2, the affinity map 200 indicates that requester device 1 has established a connection with controller 1 to access storage segments 1 and 2 using respective different types of access operations (GETATTR indicated in the row 202, WRITE in the row 204, and READ in the row 206). Thus, there is a potential affinity between the requester device 1 and either storage segment 1 or 2. Note that the row 206 indicates that there are 150 READ operations by requester device 1 of segment 2, while the rows 202 and 204 indicate that requester device 1 has performed 15 GETATTR and WRITE operations of storage segment 1. In some examples, based on the information in rows 202, 204, and 206, a connection scheduler 116 can compute a first affinity measure between requester device 1 and storage segment 1, and a second affinity measure between requester device 1 and storage segment 2.

For example, a weighted affinity measure can be computed as follows:

$$\text{WEIGHTED\_AFF\_MEASURE(CONTROLLER,REQUESTER,SEGMENT)} = \Sigma_1^{NOPS} \text{OPWEIGHT}(OP) \cdot \text{OPCOUNT(CONTROLLER,REQUESTER,SEGMENT, OP)}. \quad \text{(Eq. 1)}$$

In Eq. 1 above, the summation is over NOPS operations (OP) between a respective requester device (REQUESTER) and the respective storage segment (SEGMENT), through a corresponding controller (CONTROLLER), and NOPS represents the number of different types of operations between a respective requester device (REQUESTER) and the respective storage segment (SEGMENT), through a corresponding controller (CONTROLLER) (i.e., the controller to which the requester device, REQUESTER, is connected). For example, NOPS=2 for the following combination in the affinity map 200: requester device 1 accessing storage segment 1 through controller 1, as indicated by rows 202 and 204.

In Eq. 1, OPWEIGHT(OP) represents a weight assigned to a respective type of access operation (OP). For example, the GETATTR operation is assigned a first weight, the WRITE operation is assigned a second weight, and a READ operation is assigned a third weight, where the first, second, and third weights can be different. In Eq. 1, the weight, OPWEIGHT(OP), is multiplied by a count function OPCOUNT(CONTROLLER,REQUESTER,SEGMENT, OP), which is a count of the number of accesses by a requester device (REQUESTER) of a storage segment (SEGMENT) through a controller (CONTROLLER) using the access operation (OP).

In the example of FIG. 2, two weighted affinity measures can be computed between a requester device 1 and corresponding storage segments 1 and 2:
WEIGHTED_AFF_MEASURE(CONTROLLER 1,REQUESTER 1,SEGMENT 1), which is a first weighted affinity measure between requester device 1 and storage segment 1 through controller 1; and WEIGHTED_AFF_MEASURE(CONTROLLER 1,REQUESTER 1,SEGMENT 2), which is a second weighted affinity measure between requester device 1 and storage segment 2 through controller 1. The weighted affinity measures can be compared, with the larger weighted affinity measure indicating an affinity between the requester device 1 and the corresponding storage segment.

In some examples, the weighted affinity measure, WEIGHTED_AFF_MEASURE(CONTROLLER,REQUESTER,SEGMENT), can be used as the affinity measure between a requester device and a segment because a requester device connecting to different controllers would result in the requester device having a different requester identifier (REQUESTER).

In alternative examples where a requester device can maintain the same requester identifier even when connected to different controllers, an weighted affinity measure between a requester device and storage segment can be computed as follows.

$$\text{OPCOUNT(REQUESTER,SEGMENT, OP)} = \Sigma_1^{NOPS} \text{OPCOUNT(CONTROLLER,REQUESTER,SEGMENT, OP)}, \quad \text{(Eq. 2)}$$

$$\text{WEIGHTED\_AFF\_MEASURE(REQUESTER,SEGMENT)} = \Sigma_1^{NOPS} \text{OPWEIGHT}(OP) \cdot \text{OPCOUNT(REQUESTER,SEGMENT, OP)}. \quad \text{(Eq. 3)}$$

In Eq. 2, OPCOUNT(CONTROLLER,REQUESTER,SEGMENT,OP) is summed across NCTRL controllers to obtain OPCOUNT for a combination of a requester device (REQUESTER), a storage segment (SEGMENT), and a type of access operation (OP). Then Eq. 3 sums OPCOUNT(REQUESTER,SEGMENT, OP) over NOPS operations to obtain the weighted requester-segment affinity measure, WEIGHTED_AFF_MEASURE(REQUESTER,SEGMENT).

In some examples, the weighted affinity measures (Eq. 1 or Eq. 3) can be reverse sorted in a list of requester-segment affinity measures. In other words, in some examples, the list of requester-segment affinity measures has a highest requester-segment affinity measure at the beginning of the list, and a lowest requester-segment affinity measure at the end of the list. Each requester device has a respective requester-segment affinity measure list. An example of an affinity measure list is depicted as element 312 in FIG. 3, discussed below.

Figure 3:
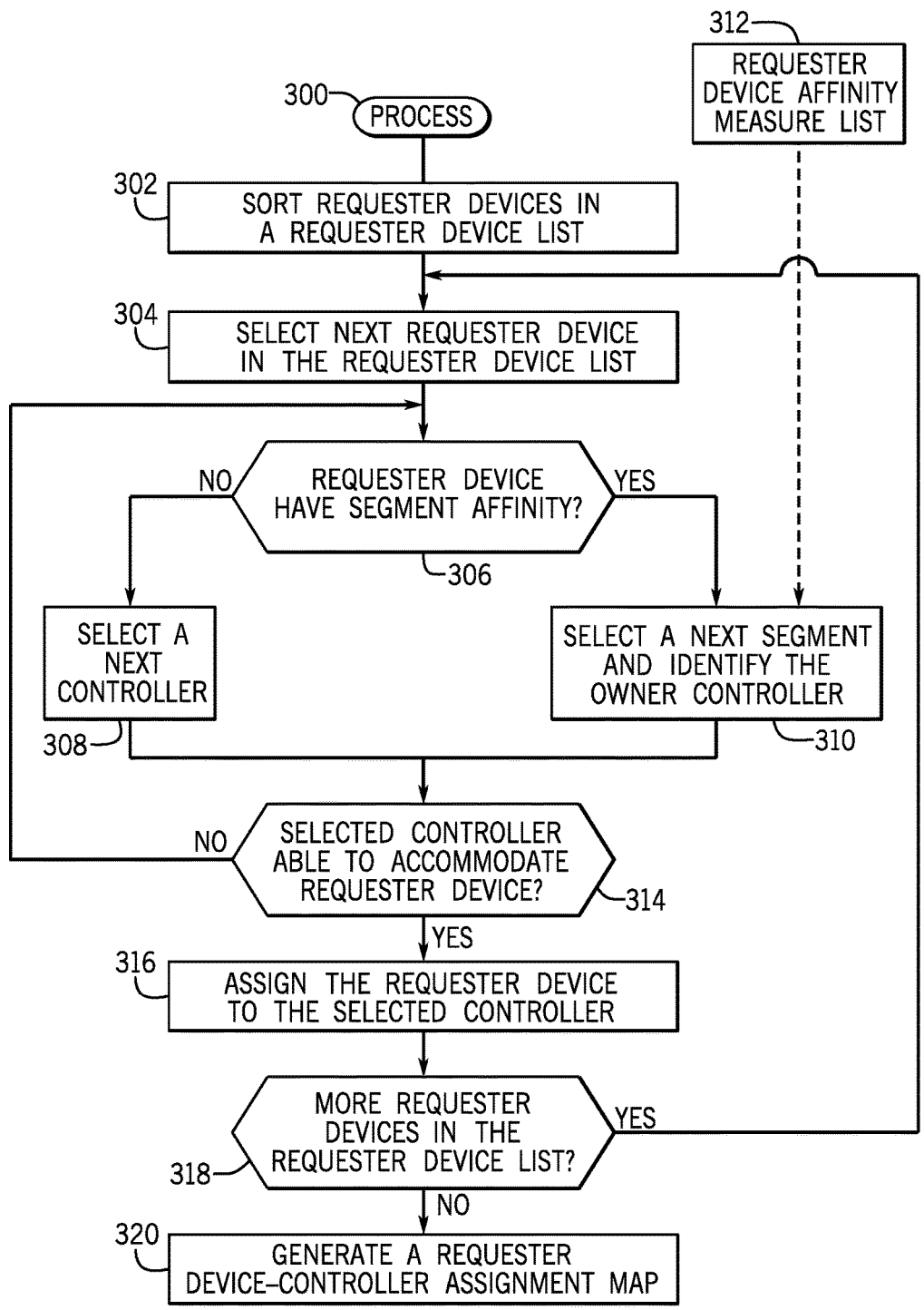
FIGS. 3 and 4 are flow diagrams of processes of accessing objects based on affinity between access devices and storage segments, according to various examples.

FIG. 3 is a flow diagram of an example process 300 for assigning requester devices to controllers based on affinity between requester devices and storage segments. The process of FIG. 3 can be performed by a connection scheduler 116, by multiple connection schedulers 116-1 to 116-N, or by a combination of connection schedulers and the switch controller 114. The process 300 sorts (at 302) requester devices in a specified order in a requester device list. For example, the requester devices can be sorted by priority, with the requester device having the highest priority placed at the beginning of the requester device list, and the requester device having a lowest priority at the end of the requester device list. The priorities of the respective requester devices can be configured by an administrator or can be based on other factors. In other examples, the requester devices can be sorted in a different manner in the requester device list, such as based on geographic location, type of requester device, etc.

The process 300 selects (at 304) the next requester device in the requester device list. The process next determines (at 306) whether the requester device has segment affinity. In certain examples, a requester device does not have segment affinity if the requester device accesses different storage segments relatively evenly, such that the requester device does not have any specific affinity to any of the storage segments. This can be due to the nature of the workload of the affinity device and the locations of the objects that are being accessed by the requester device. For example, a requester device can include a program that scans an entire filesystem namespace, such as to perform a search. There can be other examples of programs that can access objects relatively evenly across multiple storage segments.

Requester devices can be considered to not have segment affinity if the requester-segment affinity measures computed according to Eq. 1 for the different combinations of the requester device and the storage segments differ by less than a specified threshold from one another.

If the requester device does not have segment affinity, then the process 300 selects (at 308) a next controller of the controller cluster 106 with which the requester device is to establish a connection. The selected next controller can be selected in a round-robin manner where the controller that is selected is a controller that was not immediately previously selected. Alternatively, the controller that is selected can be randomly selected or can be selected based on other factors, such as proximity to the requester device, the requester device and the controller being located on a same subnet, and so forth.

However, if the requester device has segment affinity, then the process 300 selects (at 310) a next storage segment in the requester device's affinity measure list 312 (which includes a reverse sorted order of weighted requester-segment affinity measures as discussed above). The selected next storage segment is the storage segment associated with the next highest weighted requester-segment affinity measure in the requester device's affinity measure list 312. The process 300 also identifies (at 310) the owner controller, which is the controller that owns the selected storage segment.

From task 308 or 310, the process 300 determines (at 314) whether the selected controller (selected at 308 or 310) is able to accommodate the requester device, based on the expected workload of the requester device. This determination can be based on resource utilization information acquired by the information collector 118 (one of 118-1 to 118-N) in the selected controller. If the selected controller is unable to accommodate the requester device, then the process 300 returns to task 306. However, if the selected controller is able to accommodate the requester device, then the process 300 assigns (at 316) the requester device to the selected controller. This assignment information pertaining to this assignment can be stored in a storage medium.

The process 300 next determines (at 318) whether there are more requester devices in the requester device list. If so, the process 300 returns to task 304.

If there are no more requester devices in the requester device list, then the process 300 generates (at 320) a requester-controller assignment map, which maps requester devices assigned to selected controllers (as assigned at 316). This generated requester-controller assignment map can be used by the switch controller 114 to program the routing information of the switch fabric 112 (FIG. 1) to cause connection establishment requests from the requester devices 110 to be directed to corresponding controllers according to the requester-controller assignment map.

For example, if the requester-controller assignment map maps requester device X to controller Y, then a connection establishment request from requester device X will be routed by the switch fabric 112 to controller Y, to establish a connection between requester device X and controller Y.

Note also that after the switch fabric 112 is programmed to redirect requester device X to controller Y, all packets (including packets of an existing connection from requester device X to another controller) will be directed to controller Y. For example, depending on the protocol used, a redirection can trigger a protocol level reset on requester device X, which can cause requester device X to re-establish a new connection with the cluster IP address, and the new connection request can be forwarded to controller Y.

The resource utilization at a given controller by a respective requester device can be computed either in a coarse manner or in a fine-grained manner. A coarse determination of resource utilization by a requester device of resources of a controller can use an approximation technique by estimating resource utilization based on aggregating resource utilization by the requester device. For example, the input/output operations (IOPs) or other measure of throughput consumed by the requester device on the controller can be summed or aggregated in a different manner. Once the IOPs or other measure of throughput for the requester device has been aggregated, an estimated resource utilization (e.g., utilization of a processing resource or a network resource or a storage resource) can be estimated based on the aggregated measure.

In other examples, a fine-grained technique of computing resource utilization can involve using accounting functions of an operating system in each controller. When the controller executes a task to satisfy a request of a requester device, a tag (or other information) can be assigned to the task, where the tag identifies the requester device. The operating system's accounting functions can then account for resource utilization based on the tags corresponding to a specific requester device. An accounting function can track the usage of a respective resource of each task that has a given tag, and aggregate the tracked resource usage to provide a total resource usage at the controller by the requester device associated with the given tag.

FIG. 3 describes an example in which the determined affinity between requester devices and storage segments is used to cause establishment of connections between requester devices and respective controllers.

Figure 4:
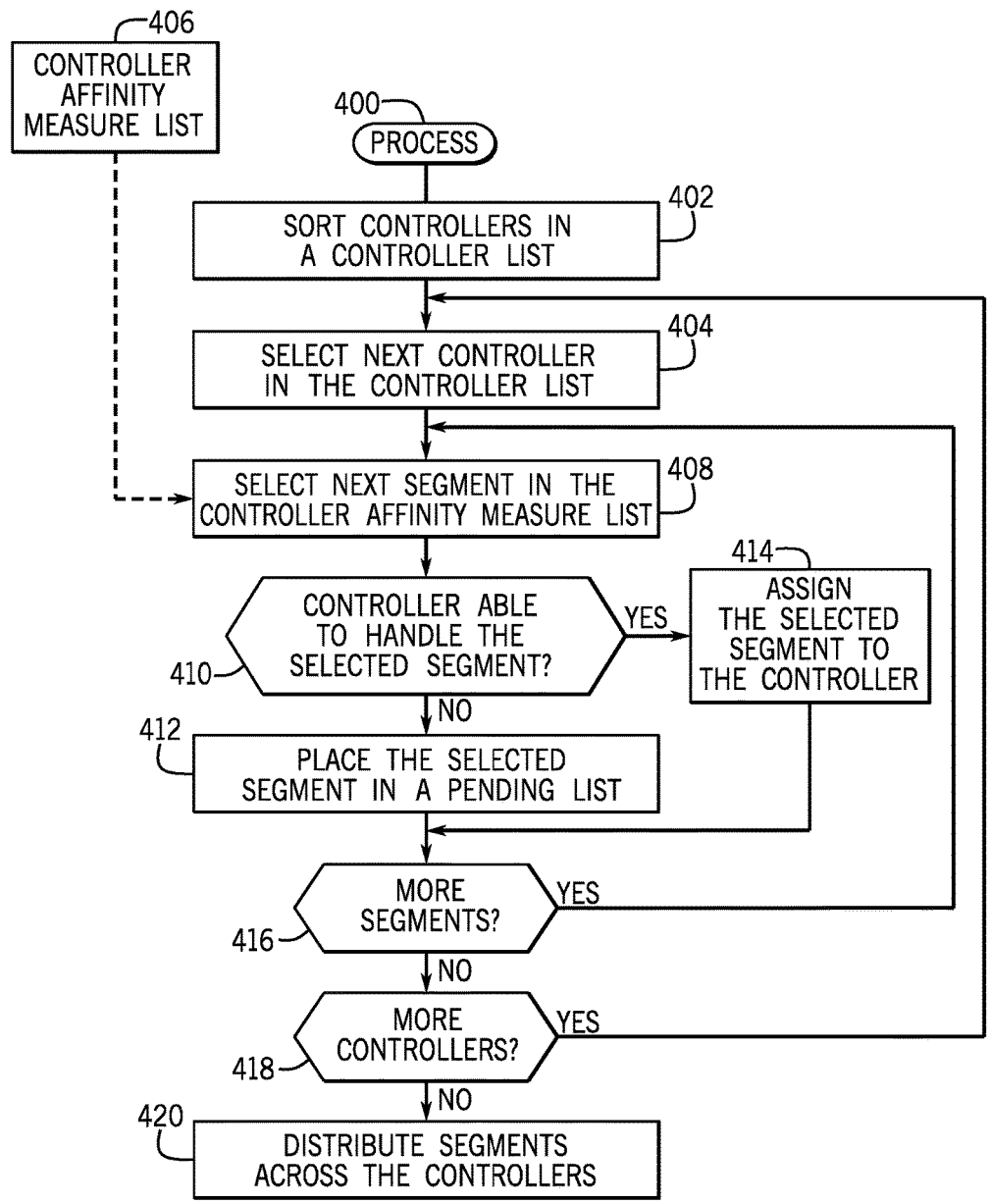

In other examples, instead of controlling the connection of a requester device to a corresponding controller, ownership of a storage segment by a controller can be controlled (changed or set). A process 400 shown in FIG. 4 depicts an example of such a technique. The process 400 sorts (at 402) controllers in an order in a controller list. For examples, the controllers can be set in priority order, with the highest priority controller at the beginning of the list, and the lowest priority controller at the end of the list. In some examples, controllers can be associated with respective priorities, which can be set by an administrator or based on other factors. In other examples, the sorting of the controllers in the controller list does not have to be based on priority, but can be based on other factors.

The process 400 selects (at 404) the next controller in the controller list. The process then selects (at 408) a next storage segment from a controller affinity measure list 406. The controller affinity measure list 406 includes weighted segment affinity measures for a controller, sorted according to a specified order.

To compute a weighted segment affinity measure for a controller, the following calculations can be performed. First, a weighted controller affinity measure is computed according to Eq. 2:

WEIGHTED_CONTROLLER_AFF_MEASURE (CONTROLLER,SEGMENT)=$\Sigma_i^{NREQ}$WEIGHTED_AFF_MEASURE(CONTROLLER,REQUESTER,SEGMENT).  (Eq. 4)

In Eq. 2, the summation is over REQUESTER (the requester devices that have accessed a specific storage segment (SEGMENT) through the corresponding controller (CONTROLLER)), and NREQ represents the number of requester devices that have accessed a specific storage segment (SEGMENT) through the corresponding controller (CONTROLLER). In Eq. 2, the value of WEIGHTED_AFF_MEASURE(CONTROLLER,REQUESTER,SEGMENT) is computed according to Eq. 1.

The weighted controller affinity measure, WEIGHTED_CONTROLLER_AFF_MEASURE(CONTROLLER,SEGMENT), represents the sum of the weighted affinity measures between requester devices and a segment (SEGMENT), WEIGHTED_AFF_MEASURE(CONTROLLER, REQUESTER,SEGMENT), of the NREQ requester devices that have established a connection with controller (CONTROLLER).

For example, in FIG. 2, row 208 indicates that requester device 1 has a connection with controller N and has accessed segment 1, and row 212 indicates that requester device 2 has a connection with the same controller N and has accessed segment 2. In this example, NREQ=2, since there are two requester devices 1 and 2 indicated by rows 208 and 212, and the weighted controller affinity measure WEIGHTED_CONTROLLER_AFF_MEASURE(CONTROLLER N,SEGMENT 1) calculated according to Eq. 4 is equal to the sum of WEIGHTED_AFF_MEASURE(CONTROLLER N,REQUESTER 1,SEGMENT 1) and WEIGHTED_AFF_MEASURE(CONTROLLER N,REQUESTER 2,SEGMENT 1).

The weighted controller affinity measures between controllers and segments can be sorted in reverse order in the controller affinity measure list 406, where each affinity measure in the controller affinity measure list 406 represents an affinity between a controller and a segment. In some examples, in the controller affinity measure list 406, the highest weighted controller affinity measure is at the beginning of the list 406, and the lowest weighted controller affinity measure is at the end of the list 406.

After the process 400 selects (at 408) the next storage segment in the controller affinity measure list 406 (the selected storage segment is the storage segment associated with the next highest weighted controller affinity measure in the list 406), the process 400 then determines (at 410) whether the controller is able to handle the selected segment, based on the resource utilization information regarding usage of resources of the controller, and based on the expected workload for the selected segment. If not, the process 400 places (at 412) the selected storage segment in a pending list. Storage segments in the pending list are distributed across controllers at a later time (discussed further below). Note that after a given storage segment is placed in the pending list, when another controller picks ownership of the given storage segment, the given storage segment is removed from the pending list.

If the process 400 determines that the controller is able to handle the selected storage segment, then the process 400 assigns (at 414) the selected storage segment to the controller. The assignment information relating to this assignment can be stored in a storage medium.

From task 412 or 414, the process 400 determines (at 416) if there are more storage segments in the controller affinity measure list 406. If so, the process 400 returns to task 408, where the next storage segment is selected for processing.

If there are no more storage segments in the controller affinity measure list 406, then the process 400 determines (at 418) if there are more controllers in the controller list. If so, the process 400 returns to task 404 to select the next controller.

If there are no more controllers in the controller list, then the process 400 distributes (at 420) the storage segments across the controllers of the controller cluster 106, based on the assignment (at 414). The process 400 further distributes the segments in the pending list to the controllers, such as in a random fashion or a round-robin fashion, or based on other factors.

Distributing a segment to a controller results in the segment being owned by the controller.

Figure 5:
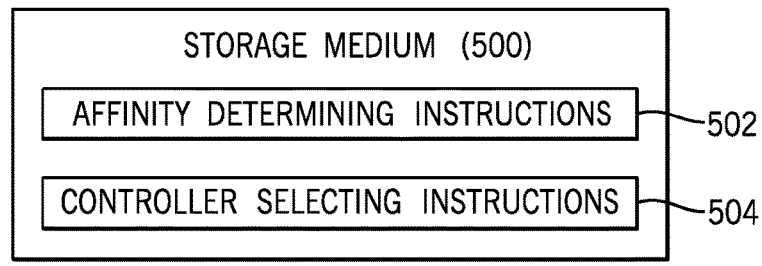
FIG. 5 is a block diagram of a storage medium storing machine-readable instructions according to further examples.

FIG. 5 is a block diagram of a non-transitory machine-readable or computer-readable storage medium 500 storing machine-readable instructions that upon execution cause a system to perform various tasks. The machine-readable instructions include affinity determining instructions 502 to determine, based on information relating to access of objects in storage segments by requester devices, an affinity between access devices and the storage segments that are managed by respective controllers of a plurality of controllers, the access devices comprising the requester devices or the controllers. The machine-readable instructions further include controller selecting instructions 504 to select, based on the affinity between the access devices and the storage segments, a controller of the plurality of controllers for serving requests of a first requester device of the requester devices to access objects.

Figure 6:
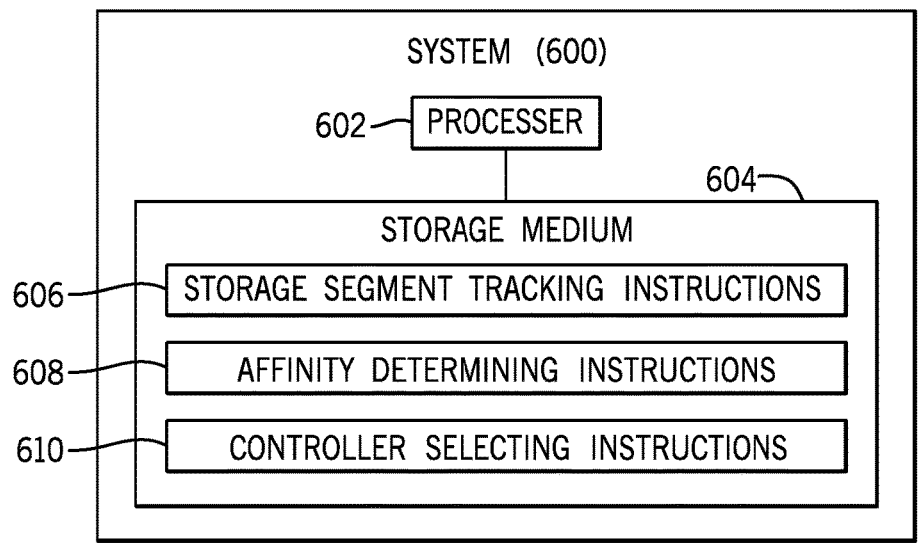
FIG. 6 is a block diagram of a system according to additional examples.

FIG. 6 is a block diagram of a system 600 that includes a processor 602 and a storage medium 604 storing machine-readable instructions executable on the processor 602 to perform various tasks. Machine-readable instructions executable on a processor can refer to the machine-readable instructions executable on a single processor or on multiple processors. A processor can include a microprocessor, a core of a multi-core microprocessor, a microcontroller, a programmable integrated circuit, a programmable gate array, or another hardware processing circuit.

The machine-readable instructions include storage segment tracking instructions 606 to track access by requester devices of objects in storage segments partitioned from a storage, the storage segments managed by respective controllers of a plurality of controllers. The machine-readable instructions further include affinity determining instructions 608 to determine, based on the tracking, an affinity between access devices and the storage segments, the access devices comprising the requester devices or the controllers. The machine-readable instructions further include controller selecting instructions 610 to select, based on the affinity between the access devices and the storage segments, a controller of the plurality of controllers for serving requests of a first requester device of the requester devices to access objects.

Figure 7:
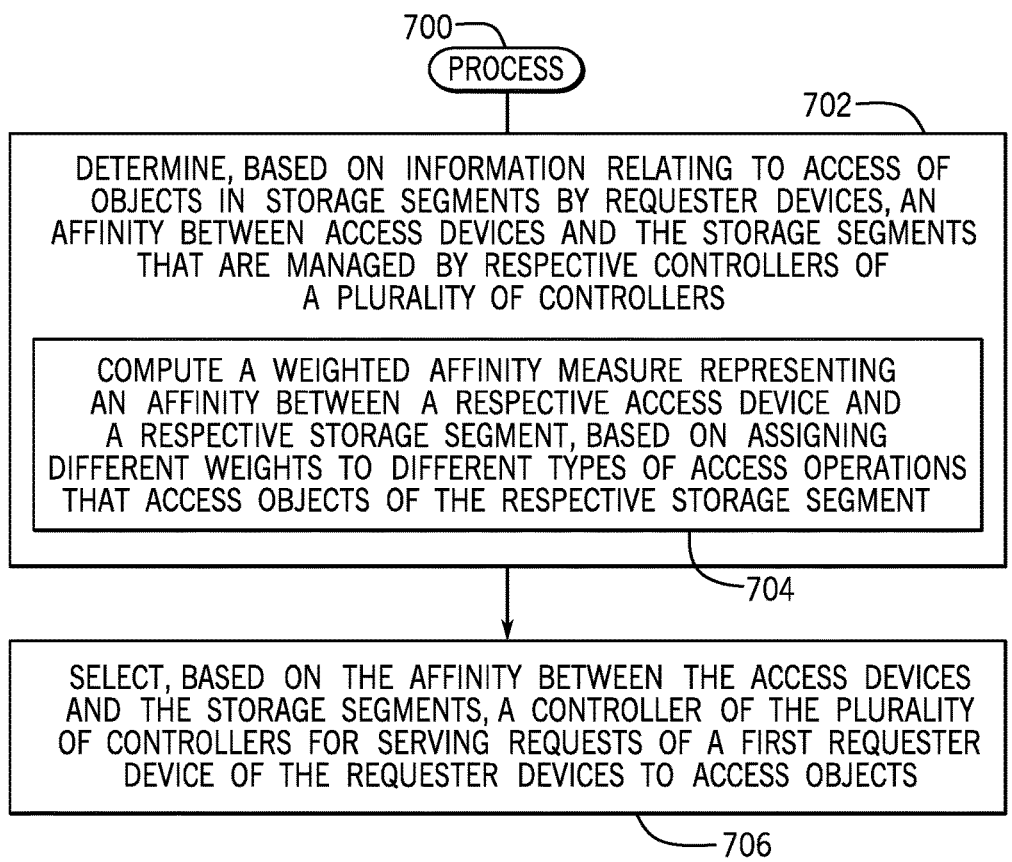
FIG. 7 is a flow diagram of a process according to other examples.

FIG. 7 is a flow diagram of a process 700 that can be performed by a system according to further examples. The process 700 includes determining (at 702), based on information relating to access of objects in storage segments by requester devices, an affinity between access devices and the storage segments that are managed by respective controllers of a plurality of controllers, the access devices comprising the requester devices or the controllers. The determining (702) includes computing (at 704) a weighted affinity measure representing an affinity between a respective access device and a respective storage segment, based on assigning different weights to different types of access operations that access objects of the respective storage segment.

The process 700 further includes selecting (at 706), based on the affinity between the access devices and the storage segments, a controller of the plurality of controllers for serving requests of a first requester device of the requester devices to access objects.

The storage medium 500 (FIG. 5) or 604 (FIG. 6) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a system to:
   determine, based on information relating to access of objects in storage segments by requester devices, an affinity between access devices and the storage segments that are managed by respective storage controllers of a plurality of storage controllers, the access devices comprising the requester devices or the storage controllers, wherein the affinity between the access devices and the storage segments represents an association between a particular access device of the access devices and a particular storage segment of the storage segments that is indicative of an increased likelihood that the particular access device will access an object of the objects stored in the particular storage segment rather than an object of the objects stored in another storage segment of the storage segments;
   select, based on the affinity between the access devices and the storage segments, a storage controller of the plurality of storage controllers for serving requests of a first requester device of the requester devices to access the objects; and
   reduce access delays experienced by the first requester device by assigning the first requester device to the selected storage controller and thereafter causing subsequent access requests issued by the first requester device to be directed to and processed by the selected storage controller.

2. The non-transitory machine-readable storage medium of claim 1, wherein the instructions further cause the system to change a connection of the first requester device from a first storage controller of the plurality of storage controllers to the selected controller, based on the affinity between the requester devices and the storage segments.

3. The non-transitory machine-readable storage medium of claim 1, further comprising in response to said selecting, changing an ownership of a segment from a first storage controller to the selected storage controller, based on the affinity between the storage controllers and the storage segments.

4. The non-transitory machine-readable storage medium of claim 3, wherein the first requester device has a connection to the selected storage controller.

5. The non-transitory machine-readable storage medium of claim 1, wherein the instructions upon execution cause the system to:
   generate, based on the information relating to access of objects in the storage segments by the requester devices, requester-segment affinity information that correlates the requester devices to the storage segments,
   wherein, for each pair of a respective requester device and a respective storage segment correlated by the requester-segment affinity information, statistical information indicating an amount of accesses of objects in the respective storage segment by the respective requester device.

6. The non-transitory machine-readable storage medium of claim 1, wherein the selecting of the storage controller is further in response to resource utilization at the selected storage controller.

7. The non-transitory machine-readable storage medium of claim 6, wherein the selecting of the storage controller is in response to determining that the selected storage controller is able to handle the resource utilization at the selected storage controller by the first requester device.

8. The non-transitory machine-readable storage medium of claim 6, wherein the selecting of the storage controller is in response to determining that the selected storage controller is able to handle requests from multiple requester devices for objects of a given storage segment.

9. The non-transitory machine-readable storage medium of claim 6, wherein the instructions upon execution cause the system to:
   determine a resource utilization by a given requester device of the selected storage controller by:
   for each respective task of a plurality of tasks at the selected storage controller in response to access operations of the given requester device, adding a tag to the respective task, the tag identifying the given requester device; and
   using a function of an operating system in the selected storage controller to calculate the resource utilization by the given requester device of a resource of the selected storage controller.

10. The non-transitory machine-readable storage medium of claim 1, wherein the instructions upon execution cause the system to:
    program, based on the selecting, routing information in a switch fabric to cause a connection to be established with the selected storage controller.

11. The non-transitory machine-readable storage medium of claim 1, wherein the storage segments that are managed by the respective storage controllers are owned by the respective storage controllers.

12. The non-transitory machine-readable storage medium of claim 1, wherein the storage controllers are part of a cluster of storage controllers having a cluster network address useable by the requester devices to establish connections with the storage controllers in the cluster of storage controllers.

13. The non-transitory machine-readable storage medium of claim 1, wherein determining the affinity between access devices and the storage segments comprises computing an affinity measure between a respective access device and a respective storage segment that assigns different weights to different types of access operations that access objects of the respective storage segment.

14. A system comprising:
a processor; and
a non-transitory storage medium storing instructions executable on the processor to:
track access by requester devices of objects in storage segments partitioned from a storage, the storage segments managed by respective storage controllers of a plurality of storage controllers;
determine, based on the tracking, an affinity between access devices and the storage segments, the access devices comprising the requester devices or the storage controllers, wherein the affinity between the access devices and the storage segments represents an association between a particular access device of the access devices and a particular storage segment of the storage segments that is indicative of an increased likelihood that the particular access device will access an object of the objects stored in the particular storage segment rather than an object of the objects stored in another storage segment of the storage segments;
select, based on the affinity between the access devices and the storage segments, a storage controller of the plurality of storage controllers for serving requests of a first requester device of the requester devices to access the objects; and
reduce access delays experienced by the first requester device by assigning the first requester device to the selected storage controller and thereafter causing subsequent access requests issued by the first requester device to be directed to and processed by the selected storage controller.

15. The system of claim 14, wherein the instructions are executable on the processor to:
change a connection of the first requester device from a first storage controller of the plurality of storage controllers to the selected storage controller.

16. The system of claim 15, wherein instructions are executable on the processor to change the connection of the first requester device from the first storage controller to the selected storage controller by re-programming routing information of a switch fabric that interconnects the requester devices and the storage controllers.

17. The system of claim 14, wherein the instructions are executable on the processor to:
change an ownership of a segment from a first storage controller to the selected storage controller.

18. The system of claim 14, wherein the affinity between access devices and the storage segments is represented by an affinity measure between a respective access device and a respective storage segment computed based on assigning different weights to different types of access operations that access objects of the respective storage segment.

19. A method comprising:
determining, by a system comprising a processor based on information relating to access of objects in storage segments by requester devices, an affinity between access devices and the storage segments that are managed by respective storage controllers of a plurality of storage controllers, the access devices comprising the requester devices or the storage controllers, the determining comprising:
computing a weighted affinity measure representing an affinity between a respective access device of the access devices and a respective storage segment of the storage segments that is indicative of an increased likelihood that the respective access device will access an object of the objects stored in the respective storage segment rather than an object of the objects stored in another storage segment of the storage segments, based on assigning different weights to different types of access operations that access objects of the respective storage segment;
selecting, by the system based on the affinity between the access devices and the storage segments, a storage controller of the plurality of storage controllers for serving requests of a first requester device of the requester devices to access the objects; and
reducing access delays experienced by the first requester device by assigning the first requester device to the selected storage controller and thereafter causing subsequent access requests issued by the first requester device to be directed to and processed by the selected storage controller.

20. The method of claim 19, wherein the selecting causes one of:
a change of a connection of the first requester device from a first storage controller of the plurality of storage controllers to the selected controller; and
a change of ownership of a storage segment from the first storage controller to the selected controller.

* * * * *